United States Patent Office 2,774,737
Patented Dec. 18, 1956

2,774,737

COMPOSITION FOR COATING ELECTROLUMINESCENT LAMPS

Eric L. Mager, Peabody, Mass., assignor to Sylvania Electric Products Inc., Salem, Mass., a corporation of Massachusetts No Drawing. Application July 2, 1953,
Serial No. 365,781

1 Claim. (Cl. 252—301.3)

This invention relates to electroluminescent lamps and especially to such lamps having the electroluminescent phosphor embedded in a ceramic dielectric.

In such devices, a coating of finely-divided ceramic material and phosphor is applied to a refractory material and fired to obtain a glaze. The original coating is done with a suspension of finely-divided ceramic and phosphor in a vehicle such as a mixture of alcohol and water. To obtain a smooth glaze, a coating thickness of 0.002 inch or more is used.

Thinner and smoother coatings than the above are often desirable in electroluminscent lamps. I have discovered that coatings of considerable smoothness, even in thicknesses of less than 0.001 inch can be produced by the addition to the coating suspension, of a temporary organic binder and a substance incompatible therewith, the resultant gel on partial drying greatly improving the smoothness and uniformity of the coating. The binder should be readily removable by vaporization or decomposition prior to the melting of the ceramic material to form a glaze, the temperature for removing the organic binder being less than that for melting the ceramic.

In one embodiment of the invention, the following ingredients are mixed, in the amounts given, to form a suspension:

| | | |
|---|---|---|
| Ceramic powder | grams | 100 |
| Electroluminescent phosphor | do | 60 |
| Ethylcellulose | do | 15 |
| Mineral oil (capacitor type) | do | 54 |
| Chlorinated diphenyl | do | 75 |
| Butanol (n-butyl alcohol) | cc | 15 |
| Xylol | cc | 435 |
| Chloroform | cc | 2100 |

The ethylcellulose which is the main binding material, and chlorinated diphenyl, which is a plasticizer for it, may be dissolved in the butanol and xylol and part of the chloroform, and then the ceramic powder milled in this mixture in a porcelain jar mill (with flint pebbles) overnight. The phosphor may then be added and the milling continued for one additional hour, after which the mill is emptied and the mineral oil and the rest of the chloroform added. After thorough mixing and straining through a 150-mesh sieve (stainless steel) this suspension is ready for spraying. The mineral oil is of the type generally used for oil-filled capacitors or transformers.

The suspension given in the above example is suitable for spraying thin coatings on glass or enamelled material having a transparent, electrically-conductive coating of the tin-oxide type. The mineral oil, being incompatible with the ethylcellulose causes a rapid increase in viscosity of the liquid film after it is applied, and the high volatility of the chloroform assists in this process. Hence there results a virtual gelling of the liquid film well in advance of complete drying. This serves to hold the suspended particles of ceramic material and phosphor in place in the film until drying occurs. Hence this prevents any flocculation, aggregation, or clumping of the suspended particles which might otherwise occur in the interim between application of the wet film and drying of the film.

After the film is dry, the organic material is vaporized by heating at 600–700° F., as mentioned before. Then the ceramic material is glazed by firing at about 1220° F.

By this method, coatings about one mil in thickness or even less and having good uniformity may be applied. To more completely preclude the presence of pinholes in the finished coating, two such coatings may be applied, the first being fired before the second coat is applied. It is feasible to apply two coats having a combined thickness of less than two mils.

The electroluminescent phosphor may be any of the types now known, for example zinc sulfide containing small amounts of copper, chlorine and lead, as shown in application Serial No. 230,713, filed June 8, 1951, and now Patent No. 2,728,730, by Keith H. Butler. Suitable electroluminescent phosphors are also shown in copending applications Serial No. 180,783, filed August 22, 1950, by Elmer C. Payne, and Serial No. 326,586, filed December 17, 1953, by Keith H. Butler and Richard M. Rulon.

The ceramic powder or frit can be one of the commercial types known to the art, for example, one of those shown in the application Serial No. 282,003, filed by Richard M. Rulon, April 12, 1952. One suitable type has the following composition, as shown in an application of Richard M. Rulon, filed of even date herewith:

| | Parts by weight |
|---|---|
| CaO | 3.9 |
| BaO | 4.8 |
| ZnO | 27.1 |
| SiO$_2$ | 21.7 |
| B$_2$O$_3$ | 26.7 |
| Na$_2$O | 8.7 |
| PbO (or MnO) | 0.7 |
| R$_2$O$_3$ | 5.8 |

In the above composition R$_2$O$_3$ has been used as a generic term to include one or more metals whose oxides can exist in that empirical form. Lead should not be present in any substantial amount in a form which can react with the phosphor to form a black, light absorbing material such as lead sulfide. Easily-reducible materials which will decrease the conductivity should also be avoided in the ceramic for best results.

The suspension can be applied to a metal base instead of to a glass base, if desired. The suspension can be applied by spraying, flowing, painting or in some other such manner.

What I claim is:

A suspension for coating electroluminescent lamps, said suspension being in the proportion of about 100 grams of ceramic powder, about 60 grams of electroluminescent phosphor powder, about 15 grams of ethyl cellulose, about 54 grams of mineral oil, about 15 cubic centimeters of butanol, about 435 cubic centimeters of xylol, about 75 grams of a plasticizer, and about 2100 cubic centimeters of chloroform.

References Cited in the file of this patent

UNITED STATES PATENTS

| | | |
|---|---|---|
| 2,090,617 | Bley | Aug. 24, 1937 |
| 2,190,210 | Kaber | Feb. 13, 1940 |
| 2,224,516 | Kerstan et al. | Dec. 10, 1940 |
| 2,318,803 | Schneider et al. | May 11, 1943 |
| 2,379,507 | Deyrup | July 3, 1945 |
| 2,566,349 | Mager | Sept. 4, 1951 |
| 2,573,200 | Hushley | Oct. 30, 1951 |